United States Patent [19]

Bullington et al.

[11] Patent Number: 5,420,428

[45] Date of Patent: May 30, 1995

[54] INFRA-RED SENSING ARRAY

[75] Inventors: Jeff A. Bullington; Joseph T. Evans, Jr.; Carl E. Montross, Jr., all of Albuquerque, N. Mex.

[73] Assignee: Radiant Technologies, Inc., Albuquerque, N. Mex.

[21] Appl. No.: 57,099

[22] Filed: May 5, 1993

[51] Int. Cl.⁶ .......................... H01L 37/02; G01J 5/34
[52] U.S. Cl. ................................ 250/338.2; 250/332; 250/338.3
[58] Field of Search ................... 250/338.2, 338.3, 591, 250/349, 332, 370.08

[56] References Cited

U.S. PATENT DOCUMENTS

| | | |
|---|---|---|
| 3,098,996 | 7/1963 | Kretzmer . |
| 3,118,133 | 1/1964 | Meeker et al. . |
| 3,350,691 | 10/1967 | Faulis et al. . |
| 3,370,277 | 2/1968 | Van Goethem ..................... 365/149 |
| 3,416,143 | 12/1968 | Van Goethem et al. ........... 365/149 |
| 4,142,207 | 2/1979 | McCormack et al. ............ 250/338.2 |
| 4,162,402 | 7/1979 | Hopper ............................ 250/338.2 |
| 4,902,895 | 2/1990 | Hanson ............................. 250/338.2 |

Primary Examiner—Carolyn E. Fields
Attorney, Agent, or Firm—McCubbrey, Bartels & Ward

[57] ABSTRACT

The sensing array detects an image by measuring the changes in the dielectric constant of individual capacitors in a rectangular array of capacitors. The present invention avoids the use of isolation transistors to eliminate the effects of other capacitors in the array when measuring the capacitance of a given capacitor in the array. During the measurement of any given capacitor in the array, the present invention maintains a zero potential difference across the capacitors that are not being measured, thereby eliminating any interference that might be caused by these capacitors.

2 Claims, 4 Drawing Sheets

INFRA-RED SENSING ARRAY

FIELD OF THE INVENTION

The present invention relates to imaging devices, and more particularly, to an improved infra-red array sensing array.

BACKGROUND OF THE INVENTION

Infra-red imaging devices typically employ an array of pyroelectric elements to generate the pixels of the infra-red image. Each pyroelectric element is a small capacitor whose capacitance changes with temperature. When an image is focused on the array, any given capacitor in the array is heated at a rate which depends on the intensity of the infra-red radiation in the image at the location sensed by that capacitor. The rate of increase in the temperature of each element can, in principle, be sensed by measuring the current flowing into or out of the capacitor in question. Unfortunately, the currents in question are quite small; hence, some form of signal averaging is typically used to improve the signal-to-noise ratio.

The signal averaging is typically performed by using an electro-optical or mechanical chopper to modulate the image at a predetermined frequency. The current detectors are then phase-locked to the modulation frequency to provide the improved signal-to-noise ratio. The phase-locked chopping schemes have been found to be expensive and unreliable in practice.

In addition, each capacitor in the sensing array must be individually addressed. Hence, the readout circuitry must include an isolation transistor for each capacitor. These transistors substantially increase the cost of a sensor array.

In addition, the isolation transistors reduce the sensitivity of the detectors. The isolation transistors introduce shot noise into the charge measurements. This noise source further aggravates the low signal-to-noise ratios inherent in these devices. The charges involved are very small; hence, the isolation transistors must be run in their non-linear region. In this region, the variation between isolation transistors becomes significant. As a result, prior art devices must be compensated for the variation in sensitivity from sensor to sensor that results from the variations in the isolation transistors. This compensation is normally performed by storing a calibration value for each pyroelectric element in the array and subtracting the calibration value from the measured value. This calibration procedure substantially increases the cost of the infra-red imaging device.

Broadly, it is the object of the present invention to provide an improved infrared imaging device.

It is a further object of the present invention to provide an infra-red imaging array in which the pyroelectric elements do not require isolation transistors.

It is a still further object of the present invention to provide an infra-red imaging array which does not require chopping of the image to enhance the signal-to-noise ratio.

These and other objects of the present invention will become apparent to those skilled in the art from the following detailed description of the invention and the accompanying drawings.

SUMMARY OF THE INVENTION

The present invention comprises a detection array for sensing an image which manifests itself as differences in capacitances between the various capacitors of an array of capacitors. The present invention includes a plurality of capacitor elements organized into a rectangular array having a plurality of rows and columns. Each said capacitor element has a bottom electrode, a top electrode, and a dielectric layer disposed between the top and bottom electrodes. All of the bottom electrodes in each column are connected together to form a column electrode. Similarly, all of the top electrodes in each row are connected together to form a row electrode. The capacitance of a particular capacitor is sensed by generating an electrical signal on the row electrodes including the capacitor while connecting the remaining row electrodes to a reference potential and the sensing current generated in the column electrode containing the capacitor while holding the column electrode in question at the reference potential.

DETAILED DESCRIPTION OF THE INVENTION

Figure 1:
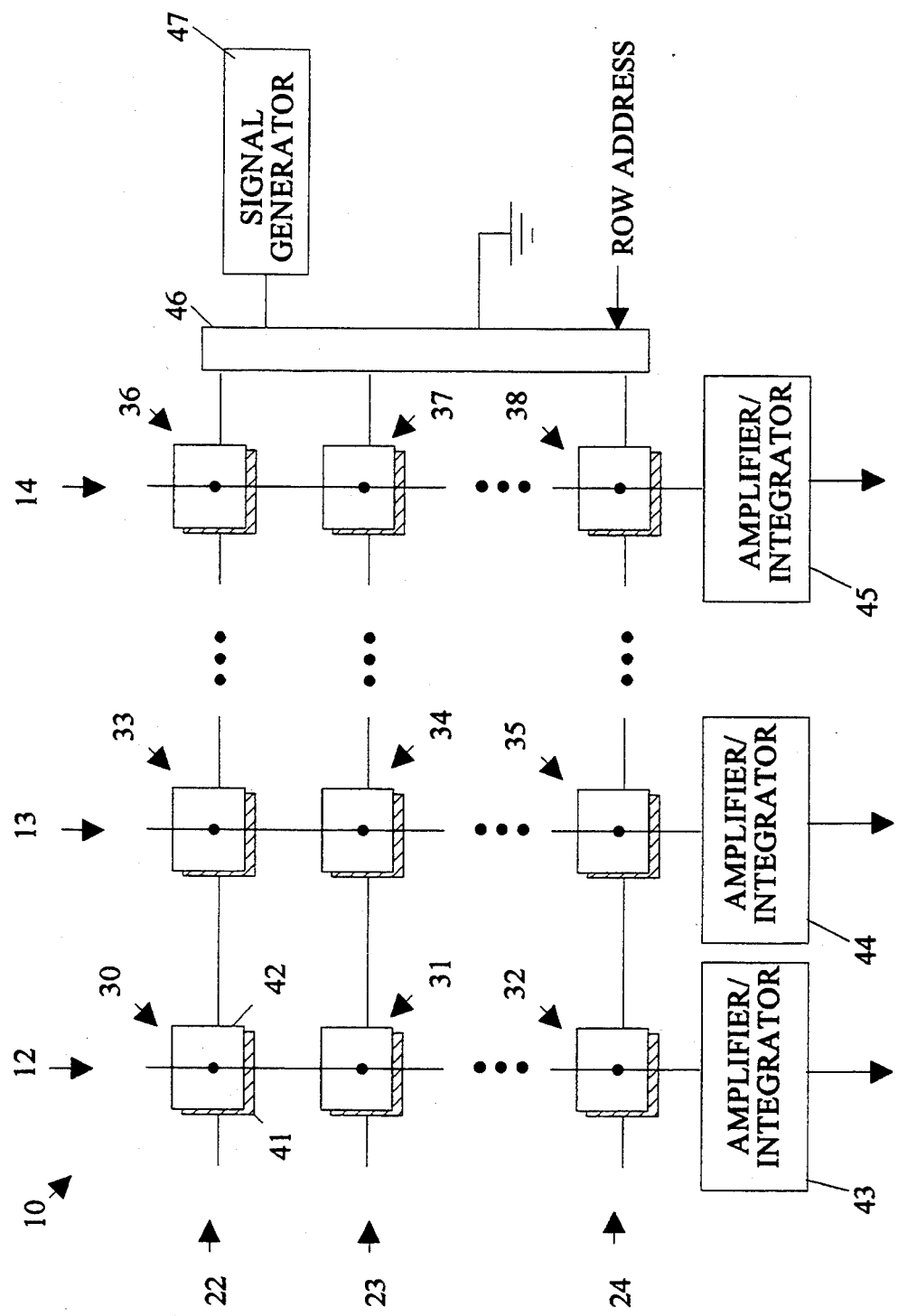
FIG. 1 is a block diagram of an infra-red sensor array according to the present invention.

The present invention may be more easily understood with reference to FIG. 1 which is a block diagram of an infra-red sensor array 10 according to the present invention. Infra-red sensor array 10 includes an array of pyroelectric elements of which pyroelectric elements 30–38 are exemplary. Each pyroelectric element comprises a small parallel plate capacitor having a bottom electrode 41 and an upper electrode 42. The space between the electrodes is filled with a material having a dielectric constant that changes with temperature. The array is organized as a plurality of rows and columns. Exemplary rows are shown at 22–24, and exemplary columns are shown at 12–14. The upper electrodes of all capacitors in each column are connected together and to a charge detecting circuit comprising of a trans-impedance amplifier and charge integrator. Exemplary charge detecting circuits are shown at 43–45. The bottom electrodes of the capacitors in each row are connected together. Each row is either connected to a signal generator 47 or to ground. At any given time, no more than one of the rows is connected to signal generator 47, the remaining rows being connected to ground. The connection is made by interface circuit 46 in response to a row address signal.

Consider the case in which a pulse is applied to row 22 via signal generator 47. During the pulse, all other rows are connected to ground. The application of the pulse to the capacitors in row 22 will cause charge to be displaced from the upper plates of the capacitors in row 22. The amount of charge displaced is related to the dielectric constant of the material between the upper and lower plates of each capacitor. As noted above, this material is chosen to have a dielectric constant that changes with temperature; hence, the displaced charge from each capacitor in row 22 is a measure of the temperature of the capacitor in question.

Figure 2:
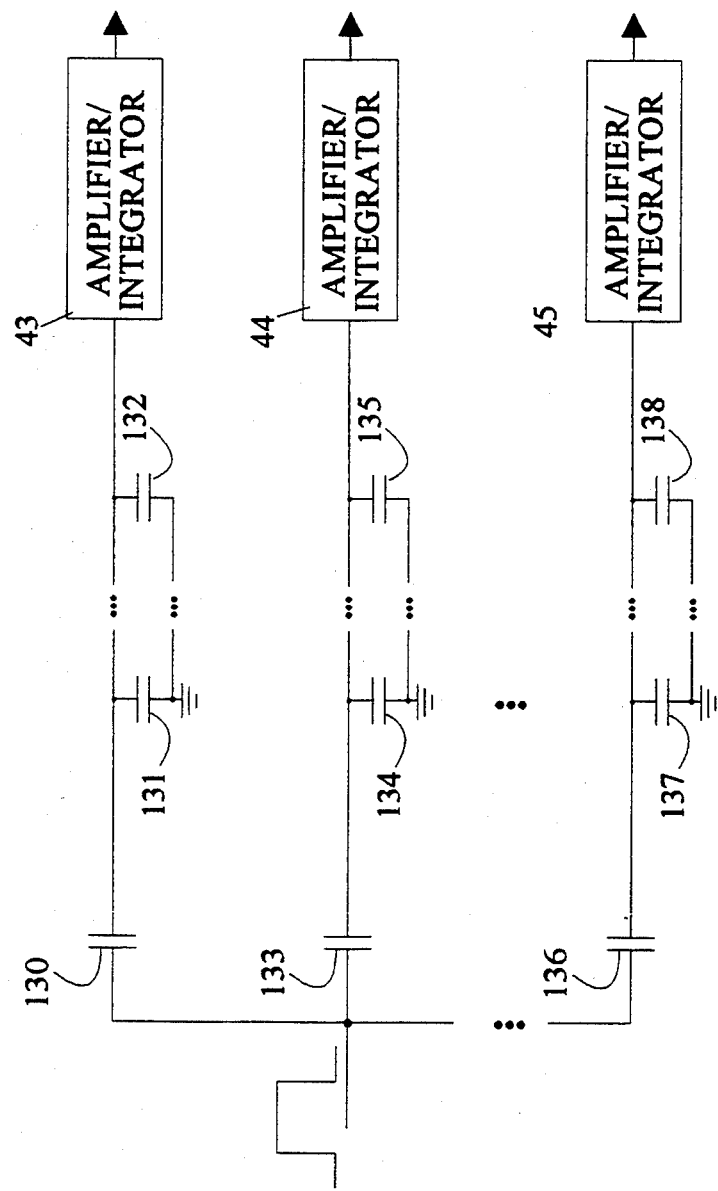
FIG. 2 is schematic drawing of the equivalent circuit for the infra-red sensor array shown in FIG. 1 when a pulse is applied to row 22 while holding all other rows at ground.

The displaced charge will either be stored on the remaining capacitors in each column or enter the amplifier/integrator at the end of the column since these are the only possible locations at which the charge can exit from each row. Refer now to FIG. 2 which is schematic drawing of the equivalent circuit for an infra-red sensor array when a pulse is applied to row 22 while holding all other rows at ground. The capacitors that are equivalent to each pyroelectric element have been numbered with a number that is 100 times greater than the number of the corresponding pyroelectric elements in FIG. 1. The amount of charge that may be stored on any of the capacitors having one plate thereof connected to ground is proportional to the voltage drop across the capacitor. The voltage drop in question is equal to the voltage at the input to each of amplifier/integrator circuits. Hence, if the amplifier/integrator circuits are chosen such that they maintain an input potential at ground, no charge will be stored on the other capacitors in each column. In this case, the charge measured by the amplifier/integrator circuit will be that displaced from the pulsed capacitor independent of the remaining capacitors in the column. Hence, the present invention does not require the use of isolation transistors.

Figure 3:
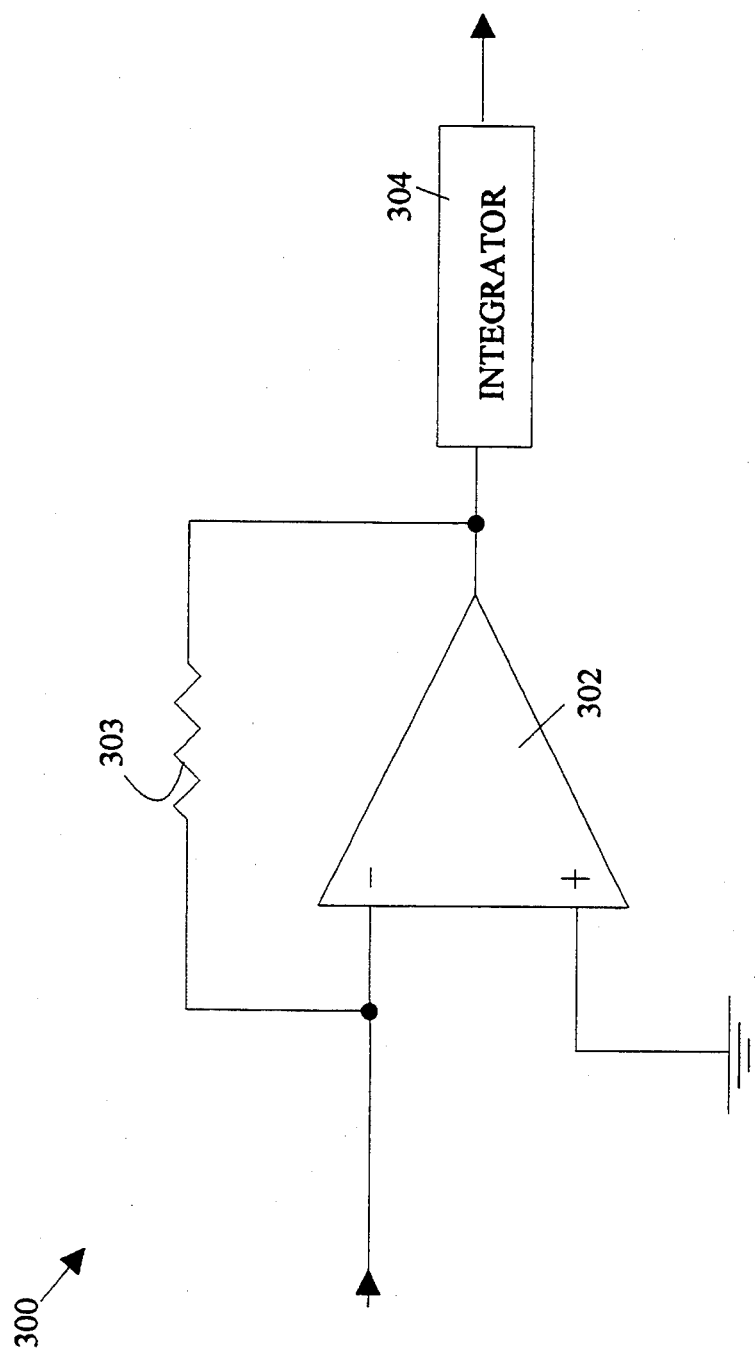
FIG. 3 is the preferred embodiment of an amplifier/integrator circuit for use in the present invention.

Current-to-voltage amplifier circuits are well known to the electronic arts. Such circuits have effective input impedances of zero. The preferred embodiment of an amplifier/integrator circuit for use in the present invention is shown in FIG. 3 at 300. The amplifier section is constructed from an operational amplifier 302 having its non-inverting input tied to ground. When a current pulse is received on the inverting input, the amplifier output moves to cause an equal, but opposite current to flow into the inverting node via resistor 303, effectively holding the inverting node at ground. The output of the amplifier is fed to an integration circuit 304 whose output may be used to determine the temperature of the pyroelectric element being measured. Integrators are well known to the electronic arts, and hence, will not he discussed in more detail here.

Figure 4:
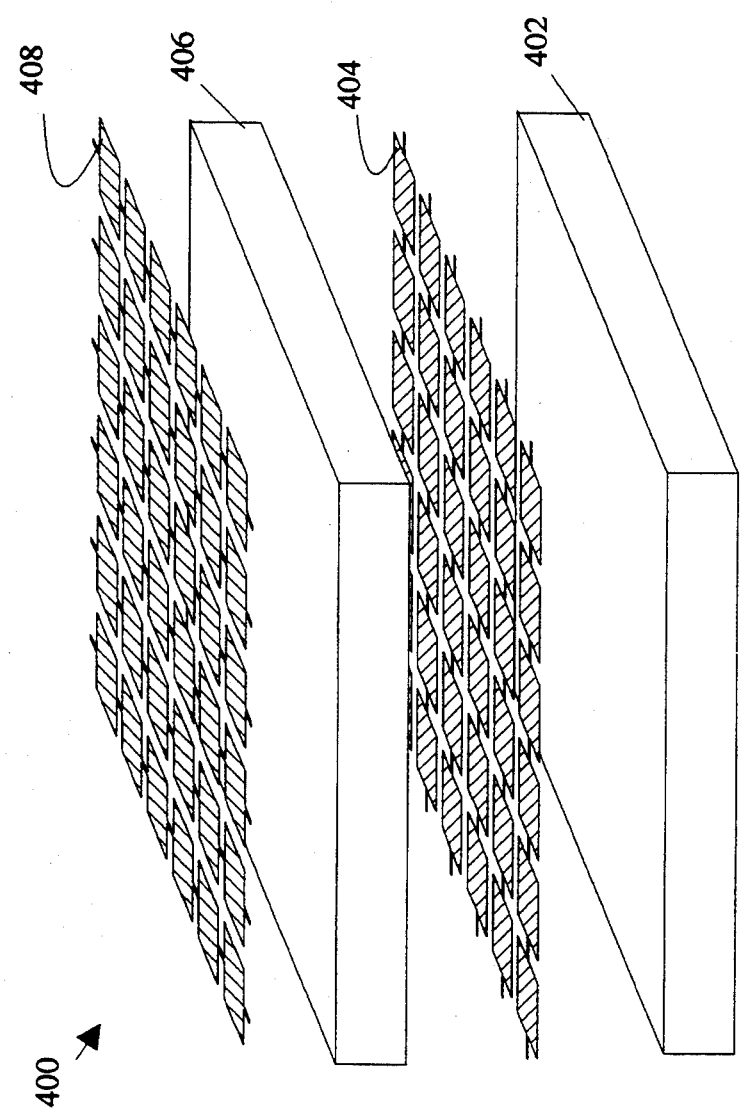
FIG. 4 shows the construction of an infra-red sensor according to the present invention.

Refer now to FIG. 4 which illustrates the construction of a infra-red sensor 400 according to the present invention. Infra-red sensor 400 is preferably constructed on a silicon substrate 402. A silicon substrate is preferred because the amplifier/integrator circuitry may be fabricated on the same substrate by conventional integrated circuit fabrication techniques. The bottom electrodes of the capacitors are constructed on substrate 402 by depositing a platinum layer 404 which is patterned as connected rows of electrodes. The bottom electrodes 404 are preferably attached to substrate 402 with the aid of a $TiO_2$ "glue" layer which prevents separation of the bottom electrode layer from substrate 402 during later processing steps that involve substantial heating of substrate 402 and bottom electrode layer 404. The glue layer is generated by evaporating 150A of pure metallic titanium onto the substrate 402. The titanium layer is then annealed at 650° C. for 0.5 hours to fully oxidize the titanium, thereby creating $TiO_2$. A 1000 Å layer of platinum is then deposited on $TiO_2$ layer by evaporation. The platinum is annealed at 650° C. for 1 hour. The annealing step promotes adhesion between the metal oxide and the platinum. The platinum layer is then masked and etched with aqua regia to form bottom electrode layer 404.

A dielectric layer 406 is then deposited on bottom electrode layer 404. As noted above, the dielectric material can be any insulating material whose dielectric constant changes with temperature. In the preferred embodiment of the present invention, dielectric layer is constructed from a ferroelectric material such as lead zirconate titanate (PLZT). This material has a very high dielectric constant which changes substantially with temperature. The preferred method of deposition is the conventional sol gel deposition technique. In this technique, a solution of the PLZT material is spun onto the substrate to be coated. The solution consists of a solvent carrying a metal organic complex which has been partially gelled into long chains. The chains consist of a linear array of metal atoms alternating with oxygen atoms and coordinated with hydrocarbon groups along the outside of the linear array. The chains are normally formed by hydrolysis of alkoxides which are individual metal atoms bonded to the hydrocarbons. The alkoxides are mixed to produce the desired ratio of metal atoms in the final ceramic and then water is added to the mixture. The water hydrolyzes the individual alkoxide molecules into the chains which remain suspended in the solvent. In this way, metal oxide molecules are dissolved in solvents such as simple alcohols.

The sol gel is spun onto the substrate using a conventional spinning apparatus. The solvent evaporates during the spinning, leaving the surface of the substrate coated with metal organic chains. The substrate is then heated gradually to evaporate the remaining solvent. After the solvent has been evaporated, the coated substrate is heated further to break the hydrocarbon bonds. As a result, hydrogen, carbon and oxygen are released, leaving a coating of metals and oxygen. The substrate is then raised to a temperature which sinters the amorphous layer into its ceramic form. For PLZT, the hydrocarbons evaporate below 400 ° C.

Finally, a platinum layer 408 comprising the top electrodes of the capacitors is deposited on dielectric layer 406. The capacitors in this layer are patterned as connected columns of electrodes. The electrodes may be deposited and patterned which is substantially the same as that used to fabricate layer 404.

It should be noted that any circuit capable of measuring the current released from the capacitor receiving the pulse down the column connection path may be used provided its input potential is effectively held at the potential of the non-pulsed rows in the pyroelectric element array. It will also be apparent that the rows and columns may be reversed without altering the manner in which the present invention operates. While the above-described embodiments of the present invention have been described with reference to ground as the reference potential, it will be apparent to those skilled in the art that any other reference potential may be utilized.

The present invention represents a significant improvement over the prior art systems in which each pyroelectric element must be isolated from the read lines by an isolation transistor. Such systems avoid the problem of charge being trapped on the non-pulsed capacitors by isolating said capacitors from the read lines during the measurement of the charge released from the pulsed capacitors. The price paid, however, is high. The cost of providing the isolation transistors represents a significant fraction of the cost of the infra-red array. In addition, the sensitivity of the system is reduced by introducing these isolation transistors. To recover the lost sensitivity, the prior art devices must often use choppers to move the signal into a narrow bandwidth in which the noise levels may be reduced.

The present invention has been described in terms of an infra-red image generation system; however, it will be apparent to those skilled in the electronic arts that the present invention may be used for reading the capacitances of each capacitor in an array of capacitors regardless of how the differences in capacitance values have been generated. Hence, it will be apparent that the read-out method of the present invention may be applied to other applications requiring the read-out of cross-point arrays of capacitors.

Various modifications to the present invention will become apparent to those skilled in the art from the foregoing description and accompanying drawings. Accordingly, the present invention is to be limited solely by the scope of the following claims.

What is claimed is:

1. An image detection circuit comprising:

a plurality of capacitor elements organized into a rectangular array having a plurality of rows and columns, each said capacitor element comprising a bottom electrode, a top electrode, and a dielectric layer disposed between said top and bottom electrodes, said dielectric layer comprising a material having a dielectric constant that changes with temperature, all of said bottom electrodes in each said column being connected together to form a column electrode and all of said top electrodes in each said row being connected together to form a row electrode;

means for generating an electrical signal comprising means for applying a pulse to one of said row electrodes while connecting the remaining said row electrodes to a reference potential; and means for sensing the current generated in one of said column electrodes in response to the generation of said electrical signal while holding said one of said column electrodes at said reference potential so as to provide an output indicative of image radiation intensity.

2. The detection circuit of claim 1 wherein said dielectric material comprises a ferroelectric material.

* * * * *